(12) United States Patent
Mori

(10) Patent No.: US 6,791,728 B2
(45) Date of Patent: Sep. 14, 2004

(54) SCANNING OPTICAL DEVICE AND IMAGE FORMING APPARATUS

(75) Inventor: Seiichiro Mori, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/429,836

(22) Filed: May 6, 2003

(65) Prior Publication Data

US 2003/0210445 A1 Nov. 13, 2003

(30) Foreign Application Priority Data

May 10, 2002 (JP) .................................... 2002-134961
Apr. 21, 2003 (JP) .................................... 2003-115927

(51) Int. Cl.$^7$ .............................................. G02B 26/08
(52) U.S. Cl. ...................... 359/204; 359/216; 347/243
(58) Field of Search .............................. 359/204–207, 359/216–219; 347/233, 241–2

(56) References Cited

U.S. PATENT DOCUMENTS 5,165,074 A  11/1992  Melino ........................ 358/481
5,930,019 A  *  7/1999  Suzuki et al. ............... 359/204

FOREIGN PATENT DOCUMENTS

| JP | 4-255874 | 9/1992 |
| JP | 11-14923 | 1/1999 |
| JP | 11-218702 | 8/1999 |

* cited by examiner

*Primary Examiner*—James Phan
(74) *Attorney, Agent, or Firm*—Fitzpatrick, Cella, Harper & Scinto (57) ABSTRACT

In an OFS scanning optical system in which a light beam incident to a deflection surface is set to a light beam wider than the deflection surface, angles formed between the center axes of emitted distributions of light beams from light emitting points of respective lasers as light sources and the optical axis of the corresponding optical system within a main scanning section and total angular widths of laser beam radiation angles within the main scanning section are regulated. Thus, symmetry and uniformity of an illumination distribution of an imaging spot on a surface to be scanned are improved.

15 Claims, 4 Drawing Sheets

SCANNING OPTICAL DEVICE AND IMAGE FORMING APPARATUS

BACKGROUND OF THE INVENTION

1. Field of the Invention

The present invention relates to a scanning optical device and an image forming device using the scanning optical apparatus. More particularly, the present invention relates to a scanning optical device suitable to an apparatus, such as a laser beam printer or a digital copying machine, in which image formation is conducted using a laser beam produced from light emitting points of a plurality of light sources in order to achieve high speed operation and an increase in recording density, in particular, which uses an over field scanning optical system (hereinafter referred to as an OFS scanning optical system) for receiving a light beam emitted from a light source unit on a wider region than a deflection surface in a main scanning direction and scanning a surface of a photosensitive member using light.

2. Related Background Art

In recent years, high speed operation has been demanded in a digital copying machine and a laser beam printer. In order to meet the demand, such inventions have been made, which include an OFS optical system capable of scanning using the increased number of deflection surfaces of a polygon mirror as a deflector and a multi-beam scanning optical device that can simultaneously scan a plurality of scanning lines by using the increased number of light sources.

In general, an element used for a light source is a semiconductor laser and a light beam having a Gaussian distribution is emitted from the light emitting point so as to have a given spreading width.

After the emitted light beam is formed into a light beam at a spreading angle, which is regulated by an incident optical system, a part of the incident light beam is cut away by the deflection surfaces of the polygon mirror to form a scanning light beam. Because the light beam is fixed against the rotated deflection surfaces, a usage region of the light beam to be used is changed according to the rotation.

When a cutaway manner of the light beam having the Gaussian distribution is momently changed, a distribution of intensity of the scanning light beam is produced. The distribution becomes an illumination distribution on a surface to be scanned, thereby causing unevenness in density of an image.

In order to solve the above problem, various correction techniques have been created, such as a technique using a gradation ND filter disclosed in Japanese Patent Application Laid-Open No. 11-014923 and a technique for conducting electrical correction disclosed in Japanese Patent Application Laid-Open No. 04-255874. Further, an idea is devised in Japanese Patent Application Laid-Open No. 11-218702, in which an opening portion is provided in an incident side to simplify a structure.

According to the above-mentioned techniques, the illumination distribution can be improved. However, there is a demerit in that structures of parts are complicated and a cost is increased.

In the technique in which the ND filter or the opening portion is provided, there is also a problem in that a sufficient effect cannot be obtained depending on processing precision of parts, an assembly tolerance, or a variation in parts.

However, in the above-mentioned various techniques, it is assumed that the light source is disposed in a normal state. When a chip of the semiconductor laser as the light source is assembled so as to be tilted toward a main scanning direction with respect to an optical axis, the center of intensity of a substantially parallel light beam, which has emerged from a collimator lens, is shifted from the optical axis. Thus, an intensity distribution of the incident light beam, which is cut away by the polygon mirror, becomes asymmetrical.

In an extreme case, an intensity peak of a scanning line formed on a surface to be scanned is located outside a scanning effective region and the intensity distribution is tilted, so that the intensity at the peak becomes two or more times larger than an initial intensity.

When an OFS scanning optical device using a plurality of light sources is considered, it is expected that distributions of light emitted from respective semiconductor lasers are different from one another. Thus, even if all light beams are aligned by the polygon mirror deflection surfaces as deflection surfaces, when scanning is conducted using such a light beam, an illumination distribution is changed for each scanning line. Therefore, there occurs a situation where the entire image has an uneven density.

It is difficult to prevent the above problem by measures according to the above-mentioned techniques.

SUMMARY OF THE INVENTION

The present invention has been made in view of the above-mentioned problems. Therefore, an object of the present invention is to provide a scanning optical device in which distributions and exit axes of light beams emitted from light sources are specified when scanning is conducted by an OFS scanning optical device using a plurality of light sources, so that an illumination distribution on a surface to be scanned is made substantially symmetric, thereby obtaining a high image quality and high speed operation simultaneously.

Also, another object of the present invention is to provide a scanning optical device capable of making the illumination distribution substantially symmetric with respect to a scanning center axis while the extension of a structure according to the improvement of an image quality is minimized to suppress an increase in cost.

In order to attain the above-mentioned objects, according to a first aspect of the present invention, there is provided a scanning optical device including: a first optical system for guiding at least two light beams emitted from at least two light emitting points to deflection means; and a second optical system for imaging as light spots the plurality of light beams deflected-by the deflection means on a surface to be scanned, characterized in that:

the light beams incident to a deflection surface of the deflection means are set to light beams wider than the deflection surface in a main scanning direction; and in a main scanning section, when respective angles formed between the center axes of emitted distributions of the light beams from the at least two light emitting points and a corresponding optical axis of the first optical system are given by $\alpha i$, the angles among $\alpha i$ with respect to two light beams located at the longest distance from the optical axis are each given by $\alpha 1$ and $\alpha 2$, a maximum difference formed between the angles of $\alpha i$ is given by $\alpha \epsilon$, respective total angular widths of radiation angles of the light beams from the at least two light emitting points within the main scanning section are given by $\theta i$, two beam radiation angles in which a difference of the total angular widths is maximum are given by θ1 and θ2, and a difference of the beam radiation angles is given by θε=|θ1−θ2|, $$2 \geq |\alpha 1 - \alpha 2| \geq 0$$

$$4 \geq |\alpha 1 + \alpha 2| \geq 0, \text{ and}$$

$$2 \geq \alpha \epsilon / (1 + \theta \epsilon) \geq 0$$

are satisfied, where θi is a range up to $1/e^2$ of a peak of an intensity distribution of each of the light beams.

According to a second aspect of the present invention, in the first aspect of the invention, the scanning optical device is characterized in that a difference of intensities of illumination distributions of the light beams in both end parts of an effective scanning region on the surface to be scanned is within 4%.

According to a third aspect of the present invention, in the first or second aspects of the invention, the scanning optical device is characterized in that the first optical system includes a third optical system and a fourth optical system, and an optical axis of the third optical system which guides a light beam emitted from one of the at least two light emitting points to the deflection means and an optical axis of the fourth optical system which guides a light beam emitted from the other light emitting point to the deflection means are incident to the deflection surface of the deflection means while forming a predetermined opening angle within the main scanning section.

According to a fourth aspect of the present invention, in the first or second aspects of the invention, the scanning optical device is characterized in that the at least two light emitting points are included in a monolithic multi-semiconductor laser.

According to a fifth aspect of the present invention, in the first or second aspects of the invention, the scanning optical device is characterized in that the at least two light beams emitted from the at least two light emitting points are synthesized by a beam synthesizing system in the first optical system and guided onto the deflection surface of the deflection means.

According to a sixth aspect of the present invention, in any one of the first to fifth aspects of the invention, the scanning optical device is characterized in that when an incident optical axis for beam incident to the deflection surface of the deflection means of the first optical system and an optical axis of the second optical system are projected onto the main scanning section, the two optical axes substantially coincide with each other.

According to a seventh aspect of the present invention, in any one of the first to sixth aspects of the invention, the scanning optical device is characterized in that the at least two light beams emitted from the at least two light emitting points are incident from an oblique direction with respect to the deflection surface of the deflection means within a sub scanning section.

According to an eighth aspect of the present invention, in any one of the first to seventh aspects of the invention, the scanning optical device is characterized in that the at least two light emitting points are apart from each other in at least a main scanning direction.

According to a ninth aspect of the present invention, in the eighth aspect of the invention, the scanning optical device is characterized in that an angle formed between principal rays forming the largest angle therebetween among principal rays of the at least two light beams which are emitted from the at least two light emitting points and incident to the deflection surface of the deflection means is 0 degree to 6 degrees.

According to a tenth aspect of the present invention, in any one of the first to seventh aspects of the invention, the scanning optical device is characterized in that the at least two light emitting points are apart from each other only in a sub scanning direction.

According to an eleventh aspect of the present invention, in any one of the first to tenth aspects of the invention, the scanning optical device is characterized in that: the at least two light emitting points are included in a semiconductor laser; and the deflection surface of the deflection means is moved within a range in which the amount of light beam is ½ or more of a maximum value of a light amount distribution of each of the at least two light beams incident to the deflection surface of the deflection means in the main scanning section.

According to a twelfth aspect of the present invention, in any one of the first to eleventh aspects of the invention, the scanning optical device is characterized by further including at least three light emitting points.

According to a thirteenth aspect of the present invention, there is provided an image forming apparatus characterized by including:

the scanning optical device according to any one of the first to twelfth aspects;

a photosensitive member located on the surface to be scanned;

a developing unit for developing as a toner image an electrostatic latent image formed on photosensitive member using the light beams scanned by the scanning optical device;

a transferring unit for transferring the developed toner image to a material to be transferred; and a fixing device for fixing the transferred toner image onto the material to be transferred.

According to a fourteenth aspect of the present invention, there is provided an image forming apparatus characterized by including:

a scanning optical device according to any one of the first to twelfth aspects; and a printer controller for converting code data inputted from an external device into an image signal and inputting the image signal to the scanning optical device.

DESCRIPTION OF THE PREFERRED EMBODIMENTS

Figure 5:
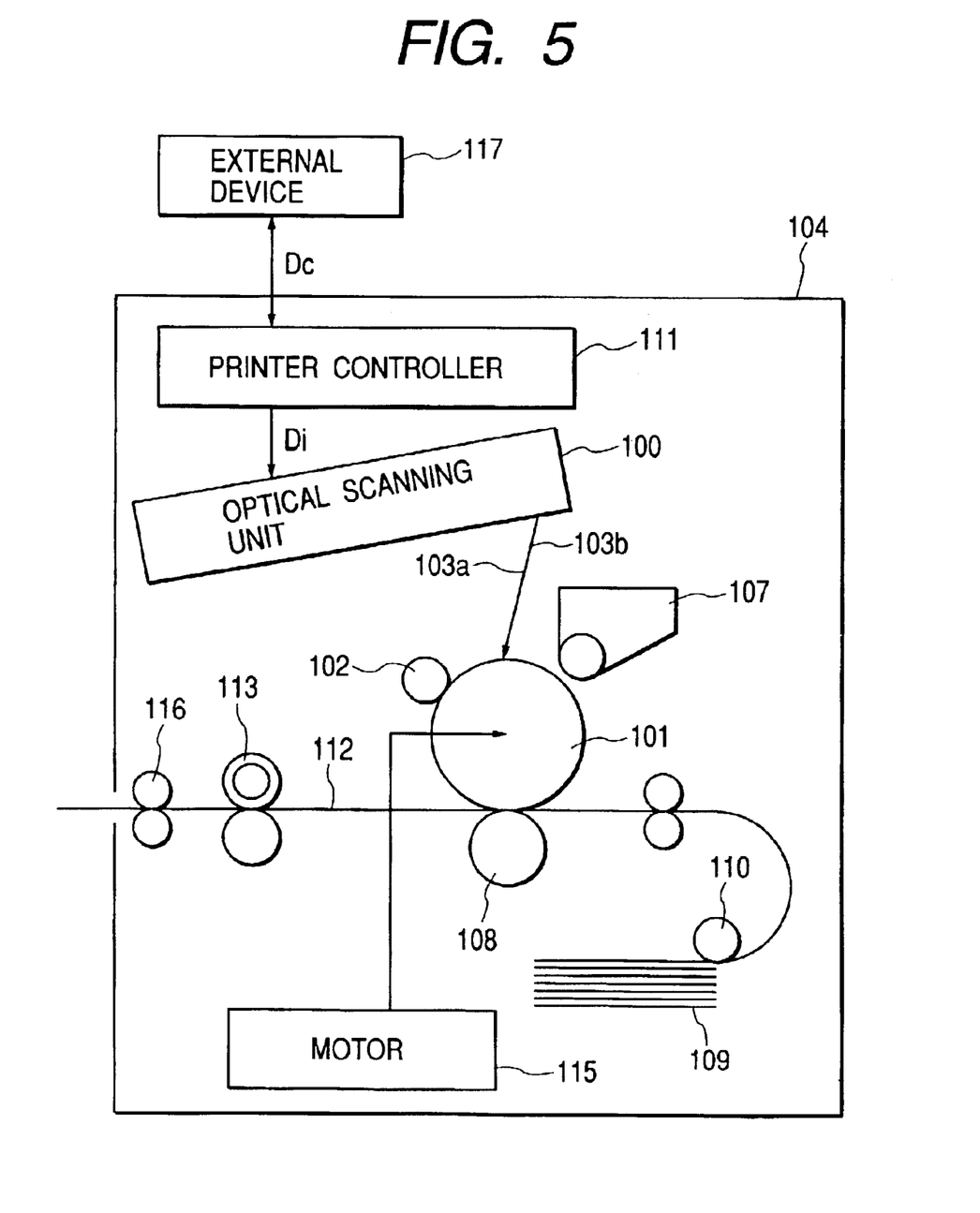
FIG. 5 shows an image forming apparatus using a multi-beam scanning optical device according to the present invention.

FIG. 5 is a main part sectional view in a sub scanning direction, showing an embodiment mode of an image forming apparatus of the present invention.

In FIG. 5, reference numeral 104 denotes an image forming apparatus.

Code data Dc is input from an external device 117 such as a personal computer to the image forming apparatus 104.

The code data Dc is converted into image data (dot data) Di by a printer controller 111 in the apparatus. The image data Di is input to an optical scanning unit 100 having a structure described in Embodiments 1 to 3. Then, a light beam 103 (103a, 103b) modulated according to the image data Di is emitted from the optical scanning unit 100 and the photosensitive surface of a photosensitive drum 101 is scanned in a main scanning direction with the light beam 103.

The photosensitive drum 101 as an electrostatic latent image bearing member (photosensitive member) is rotated clockwise by a motor 115. Then, in accordance with the rotation, the photosensitive surface of the photosensitive drum 101 is moved in a sub scanning direction orthogonal to the main scanning direction with respect to the light beam 103. A charging roller 102 for uniformly charging the surface of the photosensitive drum 101 is provided above the photosensitive drum 101 so as to abut on the surface thereof. The light beam 103 used for scanning by the optical scanning unit (the light scanning optical device) 100 is irradiated on the surface of the photosensitive drum 101 which is charged by the charging roller 102.

As described earlier, the light beam 103 is modulated according to the image data Di, and the light beam 103 is irradiated onto the surface of the photosensitive drum 101 to form an electrostatic latent image thereon. The electrostatic latent image is developed as a toner image by a developing unit 107, which is provided in the downstream side of the irradiation position of the light beam 103 in the rotational direction of the photosensitive drum 101 so as to abut against the photosensitive drum 101. The toner image developed by the developing unit 107 is transferred onto a sheet 112 serving as a material to be transferred by a transfer roller 108, which is provided below the photosensitive drum 101 so as to be opposed thereto.

Although the sheet 112 is contained in a sheet cassette 109 located in the front (right side in FIG. 5) of the photosensitive drum 101, manual feed is also possible. A feed roller 110 is provided in the end portion of the sheet cassette 109, and the sheet 112 in the sheet cassette 109 is sent to a transport path.

By the above operation, the sheet 112 to which an unfixed toner image is transferred is further transported to a fixing device located in the rear (left side in FIG. 5) of the photosensitive drum 101.

The fixing device comprises a fixing roller 113 having a fixing heater (not shown) therein and a pressure roller 114 press-contacting the fixing roller 113. The sheet 112 transported from the transferring part is heated while being pressurized by the press-contacting part which comprises the fixing roller 113 and the pressure roller 114, so that the unfixed toner image on the sheet 112 is fixed. Further, a delivery roller 116 is provided in the rear of the fixing roller 113, and the sheet 112 subjected to toner image fixing is delivered to the outside of the image forming apparatus.

Although not shown in FIG. 5, a printer controller 111 conducts not only data conversion described earlier but also control of respective parts of the image forming apparatus such as the motor 115, control of a polygon mirror in the scanning optical device to be described later, and the like.

Figure 1:
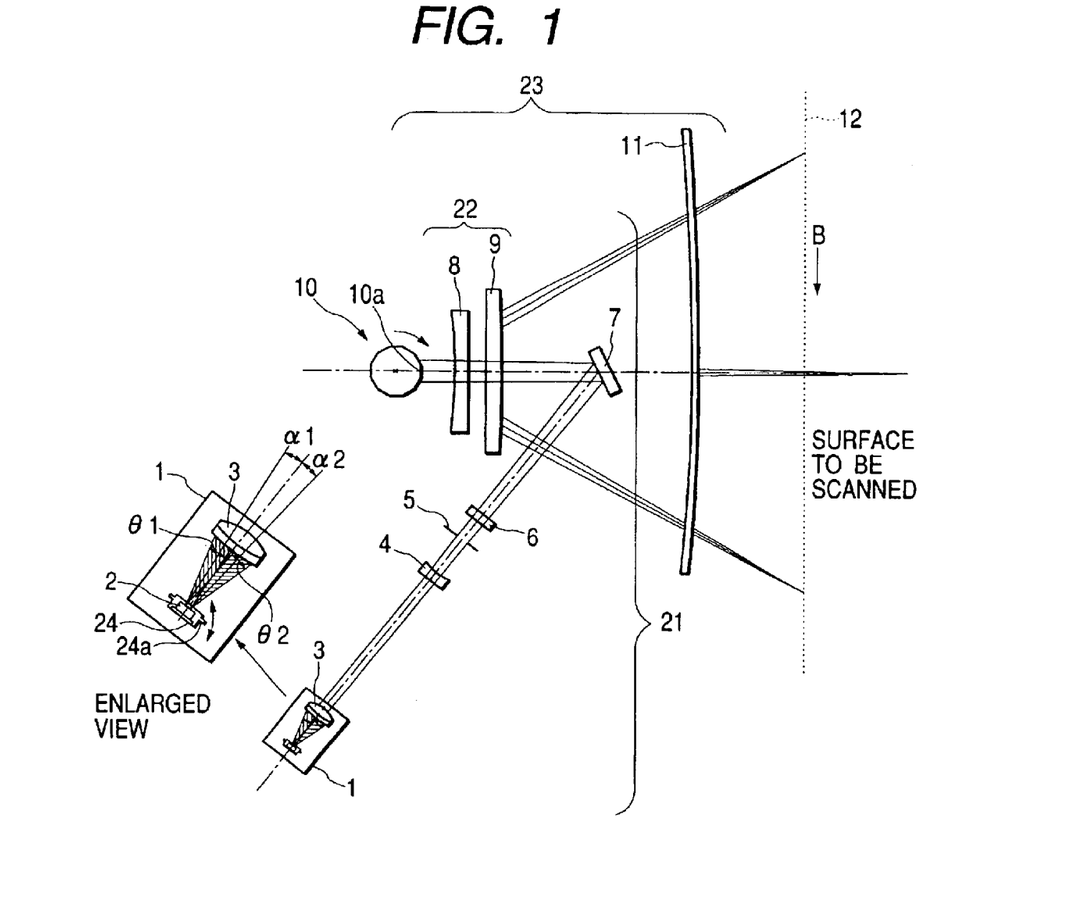
FIG. 1 is a main scanning sectional view of an OFS multi-beam scanning optical device of Embodiment 1.

Hereinafter, the scanning optical device used in the present invention will be described in detail with reference to the drawings.
(Embodiment 1)
FIG. 1 is a main scanning sectional view of an embodiment for an OFS multi-beam scanning optical device according to the present invention.

In the drawing, reference numeral 1 denotes a laser unit, which includes a light source 2 composed of a semiconductor laser having two light emitting points and a collimator lens 3, and emits two substantially parallel light beams by conducting a predetermined optical adjustment.

In order to conduct initial adjustment such that the illumination distribution of a scanning line on a surface to be scanned 12 becomes substantially symmetric with respect to a scanning center axis, the laser unit 1 in this embodiment is constructed so to rotate about an axis including the light emitting points of the light source in a sub scanning direction perpendicular to a main scanning direction by an adjusting unit 23.

Also, in this case, the two light emitting points are located such that a predetermined sub scanning interval is obtained, taking into consideration imaging magnification of the scanning optical device. For example, setting is conducted so that an intermediate point between the two light emitting points is used as the rotation center and the light source is rotated about the axis to obtain the predetermined sub scanning interval.

Note that, when the imaging magnification in the sub scanning direction is not so high, the light emitting points may be arranged in a direction parallel to the sub scanning direction to project light on the surface to be scanned by predetermined magnification.

Reference numeral 4 denotes a diverging lens having negative refracting power (negative lens), and 5 denotes a diaphragm plate (aperture stop) for regulating a passing light beam to shape it into a beam form. Reference numeral 6 denotes a cylindrical lens having predetermined refracting power in only the sub scanning direction, and 7 denotes a reflecting mirror, which reflects a light beam emitted from the laser unit 1 to a light deflector 10 side.

Note that each of the elements such as the diverging lens 4, the diaphragm plate 5, the cylindrical lens 6, the reflecting mirror 7, and scanning lenses 8 and 9 described later constitutes elements of an incident optical system (first optical system) 21. Reference numeral 10 denotes a polygon mirror of 12 surfaces (rotating polygonal mirror) as the light deflector, which is rotated at a constant speed in a direction indicated by an arrow in the drawing by a drive unit (not shown) such as a motor.

Reference numeral 23 denotes an imaging optical system (second optical system) having an fθ characteristic and an imaging performance. The imaging optical system includes a scanning lens system (fθ lens system) 22 having first and second scanning lenses 8 and 9 with predetermined power in the main scanning direction and a longitudinal cylindrical lens (longitudinal lens) 11 having predetermined power in only the sub scanning direction. In the imaging optical system, the light beam deflected by the light deflector 10 is imaged onto the surface to be scanned 12. In addition, a deflection surface 10a of the light deflector 10 and the surface to be scanned 12 are substantially conjugated with each other within the sub scanning section to compensate for the tilt of the deflection surface.

Note that the longitudinal lens 11 does not have refracting power in the main scanning direction. Thus, in order to keep constant a spot diameter and a curvature of field on the surface to be scanned 12 in the sub scanning direction, the refracting power within the sub scanning section is changed in the longitudinal direction of the lens. Accordingly, to easily form such a shape, a lens obtained by plastic injection molding is used as the longitudinal lens 11 in addition to the scanning lenses 8 and 9.

Reference numeral 12 denotes the photosensitive drum surface as the surface to be scanned.

In the structure of this embodiment, when the optical axis of the incident optical system 21 and the optical axis of the imaging optical system 23 are projected within the main scanning section, the optical axes are substantially aligned with each other. In other words, respective elements are constructed such that the light beam that emerges from the incident optical system 21 is made incident to the deflection surface 10a at the center or substantially the center of the deflection angle of the light deflector 10 within the main scanning section.

In this embodiment, each light beam which is optically modulated by the semiconductor laser 2 and emitted therefrom is converted into substantially parallel light by the collimator lens 3, converted into a weak diverged light beam by the diverging lens 4, limited by the diaphragm plate 5, and made incident to the cylindrical lens 6.

Here, the weak diverged light beam made incident to the cylindrical lens 6 is made a converged light beam within the sub scanning section, passed through the second scanning lens 9 and the first scanning lens 8 through the reflecting mirror 7, and made incident to the deflection surface 10a of the light deflector 10, so that it is imaged as a substantially line image (linear image elongated in the main scanning line) in the vicinity of the deflection surface 10a.

Figure 2:
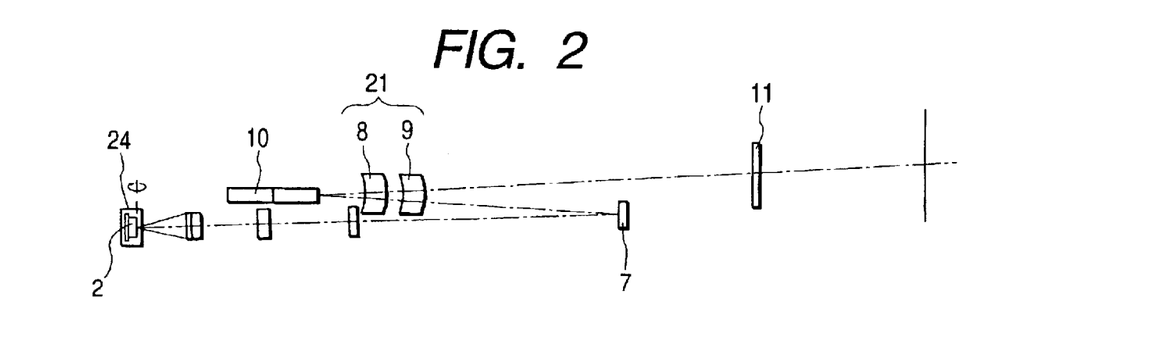
FIG. 2 is a sub scanning sectional view of the OFS multi-beam scanning optical device of Embodiment 1.

At this time, as shown in FIG. 2, the light beam made incident to the deflection surface 10a is obliquely made incident at a predetermined angle with respect to a plane perpendicular to the rotation axis of the light deflector 10 (rotation plane of the light deflector) within the sub scanning section including the rotation axis of the light deflector 10 and the optical axis of the imaging optical system 23 (oblique incident optical system).

Also, the light beam within the main scanning section is passed through the second scanning lens 9 and the first scanning lens 8 through the reflecting mirror 7 as it is to be converted into substantially parallel light, and is set so as to be necessarily and sufficiently spread from the center or substantially the center of the deflection angle of the light deflector 10 with respect to the deflection surface width of the deflection surface 10a.

After respective beam widths are completely made to coincide with each other on the deflection surface 10a of the light deflector 10, the reflected and defected light beam is guided onto the photosensitive drum surface 12 through the first scanning lens 8, the second scanning lens 9, and the longitudinal lens 11. The light deflector 10 is rotated in the arrow direction to scan the photosensitive drum surface 12 with light in a direction indicated by an arrow B (main scanning direction), so that image recording is conducted on the photosensitive drum surface 12 as a recording medium.

Further, the scanning optical device of this embodiment includes a detection unit (not shown) for detecting a scanning start timing of the plurality of light beams on the surface to be scanned 12 using a part of the plurality of light beams deflected by the light deflector 10.

Now, even when the light beam having a width that coincides with the deflection surface width use for scanning is prepared here, if the important distribution is shifted for each scanning line, the illumination distribution does not become symmetric or uniform.

Therefore, according to the present invention, an exit direction of the light beam emitted from the semiconductor laser as a light source and a spreading angle of the emitted light beam are specified as follows.

$$2 \geq |\alpha 1 - \alpha 2| \geq 0 \quad (1)$$

$$4 \geq |\alpha 1 + \alpha 2| \geq 0 \quad (2)$$

$$2 \geq \alpha \epsilon /(1+\theta \epsilon) \geq 0 \quad (3)$$

With respect to symbols indicated in the expressions, when respective angles formed by the center axes of exit distributions of light beams from the light emitting points of respective lasers as light sources and the optical axis of the first optical system are given by $\alpha 1$ and $\alpha 2$ which are indicated in the drawing, the difference $|\alpha 1-\alpha 2|$ is set as $\alpha \epsilon$, respective total angular widths of laser beam radiation angles within the same surface are set as $\theta 1$ and $\theta 2$, and the difference is set as $\theta \epsilon = |\theta 1 - \theta 2|$.

Assume that $\theta i$ is in a range up to $1/e^2$ of a peak of an intensity distribution of each light beam.

Here, with respect to $\alpha 1$ and $\alpha 2$, angles in the case where the exit directions are the same are given the same sign, and angles in the case where the exit directions are directions away from each other are given different signs.

In the expressions (1) and (2), a difference of the exit direction angles a is suppressed within 2 degrees and absolute values of the amount of distances from the respective optical axes are suppressed within 2 degrees. Thus, a difference between the illumination distributions is prevented.

Also, even in the case of the same exit direction, when the radiation angle $\theta$ is greatly changed, an effect is not obtained. Thus, the radiation angle is limited by the expression (3), so that light sources are set such that the radiation angles $\theta$ as well as the exit directions are identical.

Even when the light beams cut away by the deflection surface 10a have the same width, there is limited such a state that intensities of illumination at the same image height of the image to be scanned are different from each other because of disagreement between usage regions of Gaussian distributions of the light beams.

When the radiation angle $\theta$ is changed, a light beam width becomes wider than the deflection surface 10a and the widths of the respective light beams made incident to the deflection surface become different from each other. Thus, a problem is caused in which the amounts of light in the end regions of the light beams cut away by the same distance as the deflection surface width from the center of the light beam do not become equal.

According to the present invention, the deflection surface 10a is moved within a range in which the amounts of light in the end portions of two light beams which are reflected and deflected on the deflection surface are ½ or more of a maximum value of the light amount distribution of each light beam in the main scanning section. Thus, there is limited such a state that the intensities of illumination at the same image height of the image to be scanned are different from each other.

Setting in FIG. 1 is as follows.

$\alpha 1$: 1.6 degrees
$\alpha 2$: 1.8 degrees
$\theta 1$: 34.9 degrees
$\theta 2$: 33.6 degrees When these values are applied to the above conditional expressions, the following holds true.

$\alpha \epsilon = 0.2$
$\theta \epsilon = 1.3$
a value in the expression (1) is 0.2,
a value in the expression (2) is 3.4
a value in the expression (3) is 0.087

Thus, the respective conditional expressions are satisfied.

In order to satisfy the conditions, a light source in which such setting is conducted in advance is used. Alternatively, a rotation adjusting mechanism 24a is provided as an adjusting unit 24 and an exit axis is adjusted to satisfy the above conditions.

Specifically, in the case of rotation adjustment, the vicinity of the light emitting point of the light source is assumed as the rotational center and the adjustment is conducted such that the values are set as described above in the main scanning direction. The method is not particularly limited. If a positional relationship related to optical axes and arrangements is not disturbed, any method may be used.

As described above, when the above conditional expressions are satisfied, scanning is performed using the light beam emitted from the light source without disturbing a symmetry of the illumination distribution in a scanning region even in a different light beam region cut away by the deflection surface according to the rotation of the polygon mirror as the deflector.

Note that a difference in intensities of the illumination distribution in both end parts of the scanning region in this embodiment becomes within 4%, which is an adequate value in obtaining a preferable image.

Further, if possible, in order to improve the symmetry of the illumination distribution, it is preferable that the above conditional expressions are set as follows.

$$1.7 \geq |\alpha_1 - \alpha_2| \geq 0 \quad (4)$$

$$3.5 \geq |\alpha_1 + \alpha_2| \geq 0 \quad (5)$$

$$2 \geq \alpha\epsilon/(1+\theta\epsilon) \geq 0 \quad (6)$$

The case where two separate light sources are used will be described as Embodiment 2.

(Embodiment 2)

Figure 3:
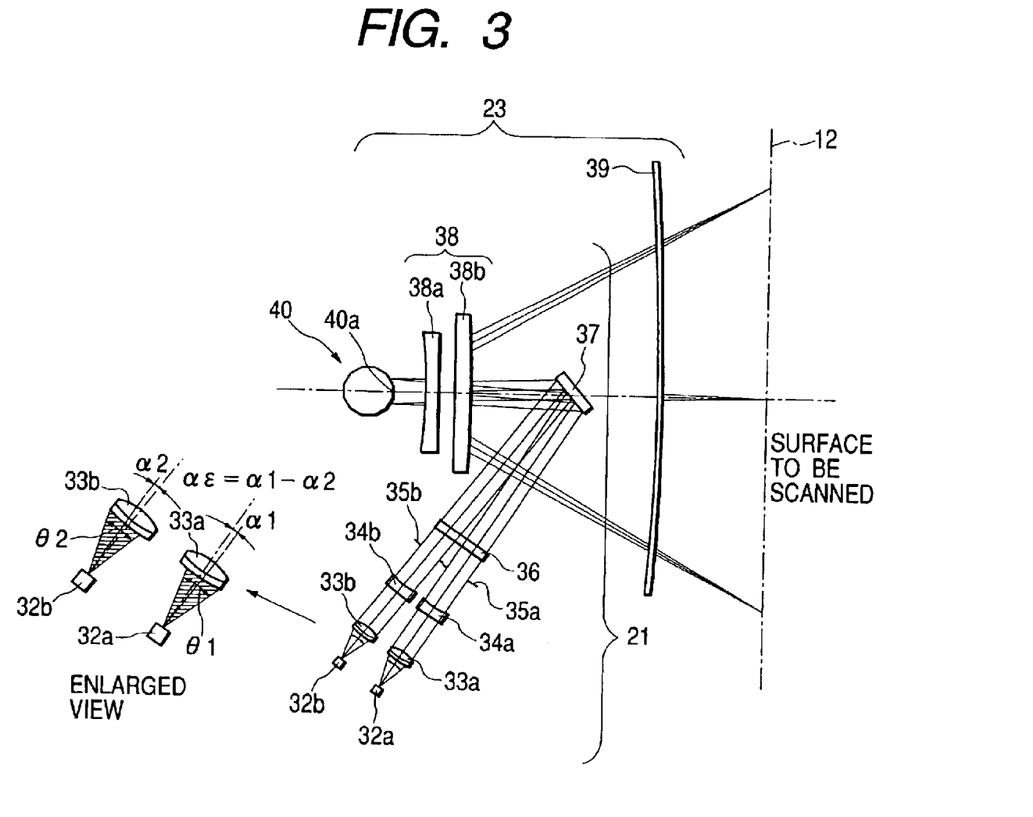
FIG. 3 is a main scanning sectional view of an OFS multi-beam scanning optical device of Embodiment 2.

FIG. 3 is a main scanning sectional view in this embodiment.

In the drawing, reference symbols 31a and 31b denote laser units, which include light sources 32a and 32b comprising semiconductor lasers and collimator lenses 33a and 33b. Two substantially parallel light beams are emitted by conducting a predetermined optical adjustment.

Reference symbols 34a and 34b denote diverging lenses each having negative refracting power (negative lens), which convert the substantially parallel light beams from the collimator lenses into weak diverged light beams.

Reference symbols 35a and 35b denote diaphragm plates (aperture stops) which regulate passing light beams to shape them into beam forms.

Reference numeral 36 denotes a cylindrical lens having predetermined refracting power in only the sub scanning direction, which images the light beams passing through the diaphragm plates 35a and 35b as substantially line images onto a deflection surface (reflection surface) 40a of a light deflector 40 in the sub scanning section.

Reference numeral 37 denotes a reflecting mirror that reflects the light beams emitted from the laser units 31a and 31b to the light deflector 40 side.

Note that each of the elements such as the diverging lenses 34a and 34b, the diaphragm plates 35a and 35b, the cylindrical lens 36, the reflecting mirror 37, and scanning lenses 38 and 39 constitutes elements of an incident optical system 21, as in Embodiment 1.

Reference numeral 40 denotes a polygon mirror (rotating polygonal mirror) as a light deflector, which is rotated at a constant speed in a direction indicated by an arrow in the drawing by a drive unit (not shown) such as a motor.

Reference numeral 23 denotes an imaging optical system having an fθ characteristic and an imaging performance. The imaging optical system includes a scanning lens system (fθ lens system) 38 having first and second scanning lenses 38a and 38b with predetermined power in the main scanning direction and a longitudinal cylindrical lens (longitudinal lens) 39 having predetermined power in only the sub scanning direction. In the imaging optical system, the light beam deflected by the light deflector 40 is imaged onto a surface to be scanned 12. In addition, a deflection surface 40a of the light deflector 40 and the surface to be scanned 12 are substantially conjugated with each other within the sub scanning section to compensate for the tilt of the deflection surface.

Further, the imaging optical system includes a detection unit (not shown) for detecting a scanning start timing of the plurality of light beams on the surface to be scanned 12 using a part of the plurality of light beams deflected by the light deflector 40.

Note that the longitudinal lens 39 does not have refracting power in the main scanning direction. Thus, in order to keep constant a spot diameter and a curvature of field on the surface to be scanned 12 in the sub scanning direction, the refracting power within the sub scanning section is changed in the longitudinal direction of the lens. Accordingly, to achieve such a shape, the lens is produced by plastic molding.

Reference numeral 12 denotes a photosensitive drum surface as the surface to be scanned.

Even in the structure of this embodiment, when the optical axis of the incident optical system 21 and the optical axis of the imaging optical system 23 are projected within the main scanning section, the optical axes are substantially aligned with each other.

In this embodiment, two incident light beams completely coincide with each other on a polygon reflection surface as a deflection and reflection surface.

An image signal, in which a light emission timing of each beam which is detected by the detection unit (not shown) is controlled, is sent to each light source, and light beams, which are controlled with timing so as to make write positions of the respective light beams on a scanning surface coincide with each other, are used for scanning the surface to be scanned.

In this embodiment, even when the light beams on the deflection and reflection surface are made to coincide with each other, if intensity distributions used for the respective light beams are different from each other, a difference of the amounts of light irradiated at the same image height of the image on an image surface is generated to cause the unevenness of density even if the write positions are made to coincide with each other, thereby degrading an image quality.

Thus, even when scanning is conducted using such light beams from the two light sources, the above conditional expressions are applied for regulation to keep an image quality.

In this embodiment, the conditions are set as follows.

$\alpha_1$: 1.2 degrees
$\alpha_2$: 1.5 degrees
$\theta_1$: 36.9 degrees
$\theta_2$: 33.8 degrees When these values are applied to the above conditional expressions, the following holds true.

$\alpha\epsilon = 0.3$
$\theta\epsilon = 3.1$
a value in the expression (1) is 0.3
a value in the expression (2) is 2.7
a value in the expression (3) is 0.073

In the case of this embodiment, α1 and α2 are angles with respect to the respective optical axes. Thus, even when the light sources are separate parts as described above, the regulation can be conducted by the same method.

In a synthesizing system (radiation arrangement) using the separate light sources, it is preferable that each distribution direction of the light beams from the light sources is separately controlled. Thus, the degree of flexibility with respect to the position adjustment of the light sources is high.

Also, an opening angle between the separate light sources is set to 6 degrees or less in this embodiment. This reason is as follows in addition to keeping a uniform illumination distribution.

Now, because the light beams emitted from two lasers define the opening angle, when they are used for scanning the deflection surface, a time lag is caused in the main scanning direction.

At this time, in the case where the previous scanning light beam reaches a scanning completion side end region and next scanning is started, if the following scanning light beam does not reach the completion end region, double illumination or the like is caused to deteriorate an image quality.

Therefore, in order to prevent double illumination, it is necessary to reduce the opening angle. However, in consideration of optical elements and the like which are disposed around the respective light sources, the opening angle needs to be large to some extent.

From this viewpoint, it is effective to minimize the opening angle. In addition, assuming that the opening angle is an incident angle into the deflection surface, when the light beam is made incident to the deflection surface and projected thereto at an angle of 6 degrees or less as compared with the case where the light beam is incident to the deflection surface from the front thereof, a difference in areas can be suppressed to 0.5% or less. Thus, a variation in illumination distribution resulting from the opening angle and the deflection angle can be suppressed to a level in which no problem is caused.

In the case of rotation adjustment and position adjustment for the light sources, even when the light sources are disposed on the same substrate, if a mechanism which is synchronized between the two light sources is used as a position adjusting mechanism for the light sources, the number of parts can be reduced. In the case of separate substrates, the same parts can be used for the two light sources, thereby suppressing an increase in cost.

Of course, it is desirable to use the light sources suitable for the above conditions. As in the above-mentioned embodiment, the adjustment is preferably conducted using the light emitting points of the light sources and vicinities thereof as the rotational centers. In any case, according to the present invention, the illumination distribution can be made symmetric in an image scanning region in advance. Thus, the number of steps of adjusting the illumination distribution again after assembling is reduced. Further, because it is expected to improve a yield, a large cost down becomes possible.

Up to this point, the scanning optical device using two beam light beams is described. However, the present invention is not limited to this. For example, a structure having three or more light emitting points may be used.

In this case, three or more single semiconductor lasers may be combined for the light source or a monolithic multi-semiconductor laser in which three or more light emitting points are arranged in a single direction may be used.

Further, a surface emitting laser including three or more light emitting points may be used.

When a plurality of light sources are combined, the above-mentioned method, that is, the method of providing the opening angle in the main scanning direction and synthesizing light beams (radiation arrangement) may be used. Alternatively, the light beams may be synthesized using a prism or a mirror. Thus, by structuring the scanning optical device by applying the conditions of the present invention for the respective cases, the same effect is obtained for the scanning optical device including four or more light emitting points.

Also, in this embodiment, description had been made using the polygon mirror having the 12-surface structure. However, the present invention is not limited to this. The number of surfaces is preferably set to a requisite number, such as 8 surfaces, 10 surfaces, or 14 surfaces, in order to achieve speedup.

Further, a deflection unit of the present invention is not limited to the polygon mirror. A defection unit such as a galvanomirror can be also applied.

(Embodiment 3)

Hereinafter, a scanning optical device including four light emitting points will be described as Embodiment 3.

Figure 4:
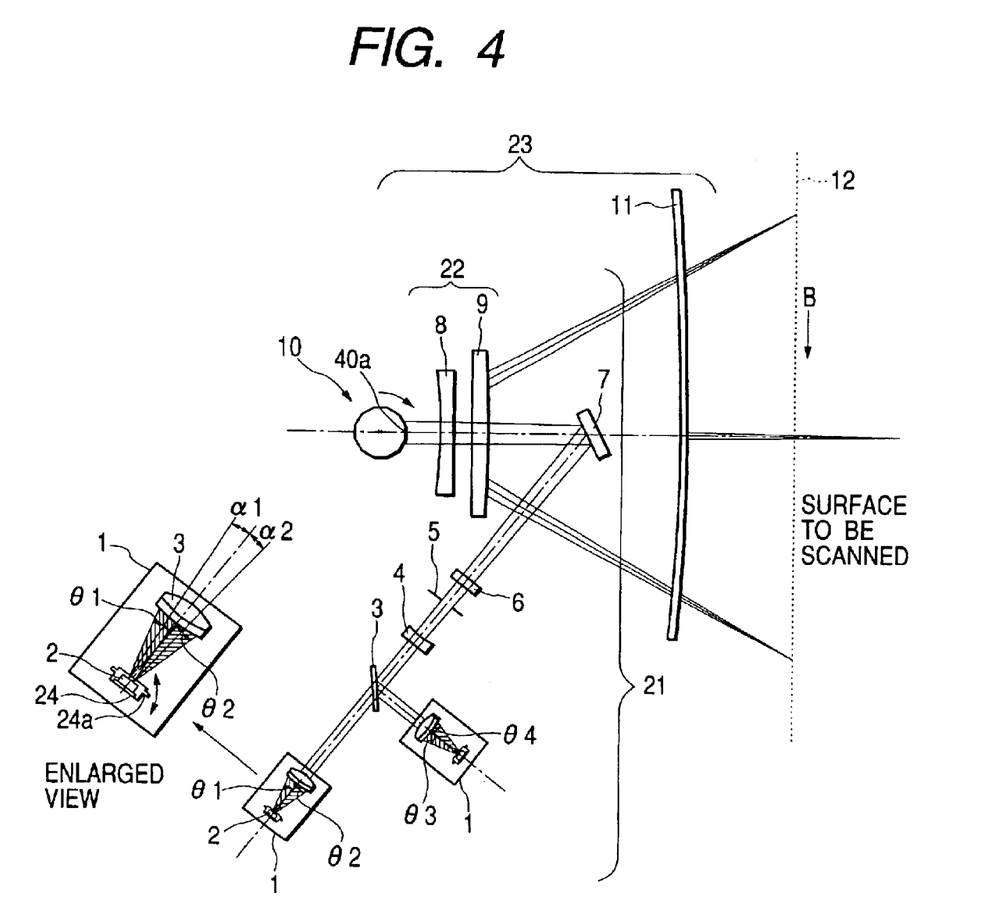
FIG. 4 is a main scanning sectional view of an OFS multi-beam scanning optical device of Embodiment 3.

FIG. 4 is a main scanning sectional view of a scanning optical device with a 4-beam structure using two monolithic multi-semiconductor lasers each having two light emitting points.

With respect to the structure, the number of beams is different from that in FIG. 1 as described above. For the sake of convenience, the same reference symbols are provided for parts having the same functions as in FIG. 1.

A point different from FIG. 1 is that a plurality of laser units $1a$ and $1b$ are provided and a half mirror 3 for synthesizing light beams emitted from the two laser units is used.

In each of the laser units $1a$ and $1b$, a monolithic multi-semiconductor laser having two light emitting points is used as a light source. The light beams with radiation angles $\theta_1$ to $\theta_4$ are emitted at exit axes with $\alpha_1$ to $\alpha_4$ from the respective light emitting points.

The system using the plurality of laser units as in this embodiment can be handled in the same manner as in the above-mentioned embodiment. In this case, the respective light emitting points are structured such that the following is satisfied.

$\alpha_1$: −0.4 degree, $\alpha_2$: 0.9 degree, $\alpha_3$: 1.3 degrees, $\alpha_4$: 0.2 degree, $\theta_1$: 34.8 degrees, $\theta_2$: 34.1 degrees, $\theta_3$: 34.2 degrees, and $\theta_4$: 33.7 degrees. Therefore, the following holds true.

$\alpha\epsilon = |1.3-(-0.4)| = 1.7$ $\theta\epsilon = |34.8-33.7| = 1.1$ a value in the expression (1) is 1.7 a value in the expression (2) is 0.9 a value in the expression (3) is 1.545

Thus, as in two beams, the respective light sources are set in ranges of the conditional expressions, so that a preferable image quality can be kept.

Also, it is preferable that there is a relationship in which the synthesized light beams satisfy the conditional expressions. Thus, in addition to the method of synthesizing the light beams using the mirror as in this embodiment, even in the method of condensing the light beams into the vicinity of the polygon deflection surface by providing opening angles with respect to the main scanning direction (radiation arrangement as in Embodiment 2), if the above conditional expressions are satisfied, it goes without saying that the device can be handled in the same manner.

As described above, according to the present invention, when scanning is conducted by the OFS scanning optical system using the plurality of light sources, distributions and exit axes of exit light beams emitted from the light sources are specified. Thus, the illumination distribution on the surface to be scanned is made substantially symmetric, so that it becomes possible to provide a high image quality scanning optical device that can be cope with high-speed operation.

Also, with the present invention, it becomes possible to provide a scanning optical device capable of making the illumination distribution substantially symmetric with respect to the scanning center axis while minimizing the extension of a structure due to the improvement of an image quality, thereby suppressing an increase in cost.

What is claimed is:

1. A scanning optical device comprising:

a first optical system for guiding at least two light beams emitted from at least two light emitting points to deflection means; and a second optical system for imaging as light spots the at least two light beams deflected by the deflection means on a surface to be scanned, wherein the light beams incident to a deflection surface of the deflection means are set to light beams wider than the deflection surface in a main scanning direction and, in a main scanning section, when respective angles formed between the center axis of emitted distributions of the light beams from the at least two light emitting points and a corresponding optical axis of the first optical system are each given by $\alpha i$, two light beam angles in which a difference of the angles is maximum are given by $\alpha 1$ and $\alpha 2$, and a maximum difference formed between the angles of $\alpha i$ is given by $\alpha \epsilon = |\alpha 1 - \alpha 2|$, respective total angular widths of radiation angles of the light beams from the at least two light emitting points within the main scanning section are given by $\theta i$, two light beam radiation angles in which a difference of the total angular widths is maximum are given by $\theta 1$ and $\theta 2$, and a difference of the beam radiation angles is given by $\theta \epsilon = |\theta 1 - \theta 2|$, $2 \geq |\alpha 1 - \alpha 2| \geq 0$ $4 \geq |\alpha 1 + \alpha 2| \geq 0$, and $2 \geq \alpha \epsilon /(1 + \theta \epsilon) \geq 0$ are satisfied, where $\theta i$ is a range up to $1/e^2$ of a peak of an intensity distribution of each of the light beams.

2. A scanning optical device according to claim 1, wherein a difference of intensities of illumination distributions of the light beams in both end parts of an effective scanning region on the surface to be scanned is within 4%.

3. A scanning optical device according to claim 1, wherein the first optical system includes a third optical system and a fourth optical system, and an optical axis of the third optical system which guides a light beam emitted from one of the at least two light emitting points to the deflection means and an optical axis of the fourth optical system which guides a light beam emitted from the other light emitting point to the deflection means are incident to the deflection surface of the deflection means while forming a predetermined opening angle within the main scanning section.

4. A scanning optical device according to claim 1, wherein the at least two light emitting points are included in a monolithic multi-semiconductor laser.

5. A scanning optical device according to claim 1, wherein the at least two light beams emitted from the at least two light emitting points are synthesized by a beam synthesizing system in the first optical system and guided onto the deflection surface of the deflection means.

6. A scanning optical device according to claim 1, wherein when an incident optical axis incident to the deflection surface of the deflection means of the first optical system and an optical axis of the second optical system are projected onto the main scanning section, the two optical axes substantially coincide with each other.

7. A scanning optical device according to claim 1, wherein the at least two light beams emitted from the at least two light emitting points are incident from an oblique direction with respect to the deflection surface of the deflection means within a sub scanning section.

8. A scanning optical device according to claim 1, wherein the at least two light emitting points are apart from each other in at least a main scanning direction.

9. A scanning optical device according to claim 8, wherein an angle formed between principal rays forming the largest angle therebetween among principal rays of the at least two light beams incident to the deflection surface of the deflection means is 0 degree to 6 degrees.

10. A scanning optical device according to claim 1, wherein the at least two light emitting points are apart from each other only in a sub scanning direction.

11. A scanning optical device according to claim 1, wherein the at least two light emitting points are included in a semiconductor laser and the deflection surface of the deflection means is moved within a range in which the amount of light beam is ½ or more of a maximum value of a light amount distribution of each of the at least two light beams incident to the deflection surface of the deflection means in the main scanning section.

12. A scanning optical device according to claim 1, wherein the scanning optical device includes at least three light emitting points.

13. A scanning optical device according to claim 1, wherein $1.7 \geq |\alpha 1 - \alpha 2| \geq 0$ $3.5 \geq |\alpha 1 + \alpha 2| \geq 0$, and $2 \geq \alpha \epsilon /(1 + \theta \epsilon) \geq 0$ are satisfied.

14. An image forming apparatus comprising:

the scanning optical device according to any one of claims 1 to 12 or 13;

a photosensitive member located on the surface to be scanned;

a developing unit for developing as a toner image an electrostatic latent image formed on photosensitive member using the light beams scanned by the scanning optical device;

a transferring unit for transferring the developed toner image to a material to be transferred; and a fixing device for fixing the transferred toner image onto the material to be transferred.

15. An image forming apparatus comprising:

the scanning optical device according to any one of claims 1 to 12 or 13; and a printer controller for converting code data inputted from an external device into an image signal and inputting the image signal to the scanning optical device.

* * * * *

UNITED STATES PATENT AND TRADEMARK OFFICE
CERTIFICATE OF CORRECTION

PATENT NO. : 6,791,728 B2
DATED : September 14, 2004
INVENTOR(S) : Seiichiro Mori It is certified that error appears in the above-identified patent and that said Letters Patent is hereby corrected as shown below:

Column 2,
Line 49, "deflected-by" should read -- deflected by --.

Column 3,
Line 44, "for" should read -- for a --; and
Line 67, "0 degree" should read -- 0 degrees --.

Column 6,
Line 9, "so" should read -- so as --.

Column 7,
Line 43, "defected" should read -- deflected --.

Column 8,
Line 17, "angles a" should read -- angles α --.

Column 11,
Line 57, "cost down" should read -- cost reduction --.

Column 13,
Line 9, "cope" should read -- coupled --.

Column 14,
Line 22, change "0 degree" to -- 0 degrees --;
Line 27, "at least two light emitting points are included in" should be deleted; and
Line 28, "a semiconductor laser and the" should be deleted.

Signed and Sealed this

Twenty-second Day of February, 2005

JON W. DUDAS
*Director of the United States Patent and Trademark Office*